United States Patent [19]

Chang et al.

[11] Patent Number: 4,494,207

[45] Date of Patent: Jan. 15, 1985

[54] DUAL TURBINE CONTROLLER

[75] Inventors: Hsiao-Nan L. Chang; John A. Cline, both of Leominster, Mass.

[73] Assignee: General Electric Company, Lynn, Mass.

[21] Appl. No.: 368,737

[22] Filed: Apr. 15, 1982

[51] Int. Cl.³ .......................... G06F 15/46; H02P 9/04
[52] U.S. Cl. .................... 364/494; 364/184; 364/149; 364/174
[58] Field of Search ............... 364/494, 149, 184, 174, 364/164, 565

[56] References Cited

U.S. PATENT DOCUMENTS

| | | | |
|---|---|---|---|
| 4,027,145 | 5/1977 | McDonald et al. | 364/494 |
| 4,029,952 | 6/1977 | Giras et al. | 364/494 |
| 4,071,897 | 1/1978 | Groves, Jr. et al. | 364/494 |
| 4,087,860 | 5/1978 | Beatty et al. | 364/494 |
| 4,153,198 | 5/1979 | Eki et al. | 364/494 X |
| 4,179,742 | 12/1979 | Stern et al. | 364/494 |
| 4,251,873 | 2/1981 | Joby | 364/184 X |
| 4,368,520 | 1/1983 | Hwang et al. | 364/494 |

Primary Examiner—Edward J. Wise
Attorney, Agent, or Firm—James W. Mitchell

[57] ABSTRACT

Primary and secondary controllers both receive independent digital representations of shaft speed. Only one of the outputs of the two controllers is used. In order to detect a fault and isolate it to one of the two controllers, comparison is performed on the response of each controller with the response of the other controller. In addition, the response of each controller is compared with a system mathematical model which predicts the response which each controller should provide to a given set of inputs. If the first comparison indicates that one of the controllers is bad, the comparison with the system mathematical model identifies the faulty controller and provides a signal which removes it from operation and enables the good controller to begin providing control signals.

3 Claims, 10 Drawing Figures

DUAL TURBINE CONTROLLER

BACKGROUND OF THE INVENTION

The present invention is related to control systems and more specifically, to control systems for controlling the speed of variable speed steam turbines.

Variable speed steam turbines typically employ a feedback loop to control the shaft speed of the steam turbine to an approximation of a commanded speed. One element in such control systems includes a speed signal generator producing a signal for comparison with the commanded speed.

For high reliability, two or more independent channels may be provided for generation of independent speed feedback signals.

In a digital speed signal generator, it has been common to employ a toothed wheel coupled to the shaft whose speed is to be measured. The toothed wheel generates an electrical signal as the teeth pass in the vicinity of a sensor. The resulting pulse information is first converted into an analog voltage with a frequency-to-voltage converter followed by an analog-to-digital conversion. This technique has the disadvantage of complexity in implementation and of having its resolution limited by the converters. In addition, such a system requires calibration.

Reliability in turbine control has been improved by employing redundant controllers, each capable of providing a control signal to control the turbine. A problem in the use of such redundant controllers is to detect failure of a controller and to transfer control to one which has not failed. One technique previously used employs three or more controllers, each receiving identical inputs and an added hardware or software system to select the controller to be used on the basis of voting. Alternatively, the outputs of multiple controllers may be combined in such a fashion that a failure in one of them which places its output out of range control will be ignored.

When two or more controllers are employed operating in parallel to produce corresponding signals, only one of which is used, when a fault is detected in the active controller, control is transferred to the previously inactive controller. Over time, the output of the previously inactive controller may drift slightly so that the active and inactive control signals, even though based on substantially identical inputs, have diverged. When switchover of source of control signal is accomplished in this circumstance, a bump or discontinuity in the control signal applied to the steam turbine is experienced. Such discontinuity can cause a rapid pulse in the acceleration of the steam turbine resulting in a change of speed which takes a finite time to overcome using the feedback speed signal.

OBJECTS AND SUMMARY OF THE INVENTION

Accordingly, it is an object of the present invention to provide a control system for a shaft speed sensor which overcomes the drawbacks of the prior art.

It is a further object of the invention to provide a control system including two controllers which each compares its response to input signals with the response of the other thereof to determine whether the controllers are both good. If one of the controllers is determined to be bad by this comparison, a system mathematical model is employed to determine which one is bad and to thus produce a signal which places the bad controller in an inactive status and the good controller in an active status.

According to an aspect of the present invention, there is provided a control system effective to produce a control signal for controlling an apparatus having a shaft rotating at a speed controllable by a position of a valve, said valve being responsive to the control signal, the control system including first and second controllers, the apparatus including means for producing a speed command signal, a speed feedback signal responsive to the speed and a valve feedback signal responsive to the position of the valve, each of the controllers, comprising means for producing a speed error signal proportional to a difference between the speed command and speed feedback signals, a valve command generator effective in response to the speed error to produce a valve command signal, means for producing the control signal in response to a difference between the valve command and valve feedback signals, a comparison circuit receiving at least some of the speed feedback, speed error, valve command, valve feedback and valve drive signals, means for communicating at least some of the speed feedback, speed error, valve command, valve feedback and valve drive signals in each of the first and second controllers to the comparison circuit in the other thereof, the comparison circuit in each of the first and second controllers being effective to detect differences between inputs from its own and from the other controller and, upon determining that the differences may indicate that its controller is bad, producing a one bad signal indicative of this fact, and a system mathematical model responsive to at least some of inputs and outputs of the controller effective to predict correct responses of the controller to the inputs, the system mathematical model being effective to produce a controller bad signal when its controller produces outputs inconsistent with its inputs.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
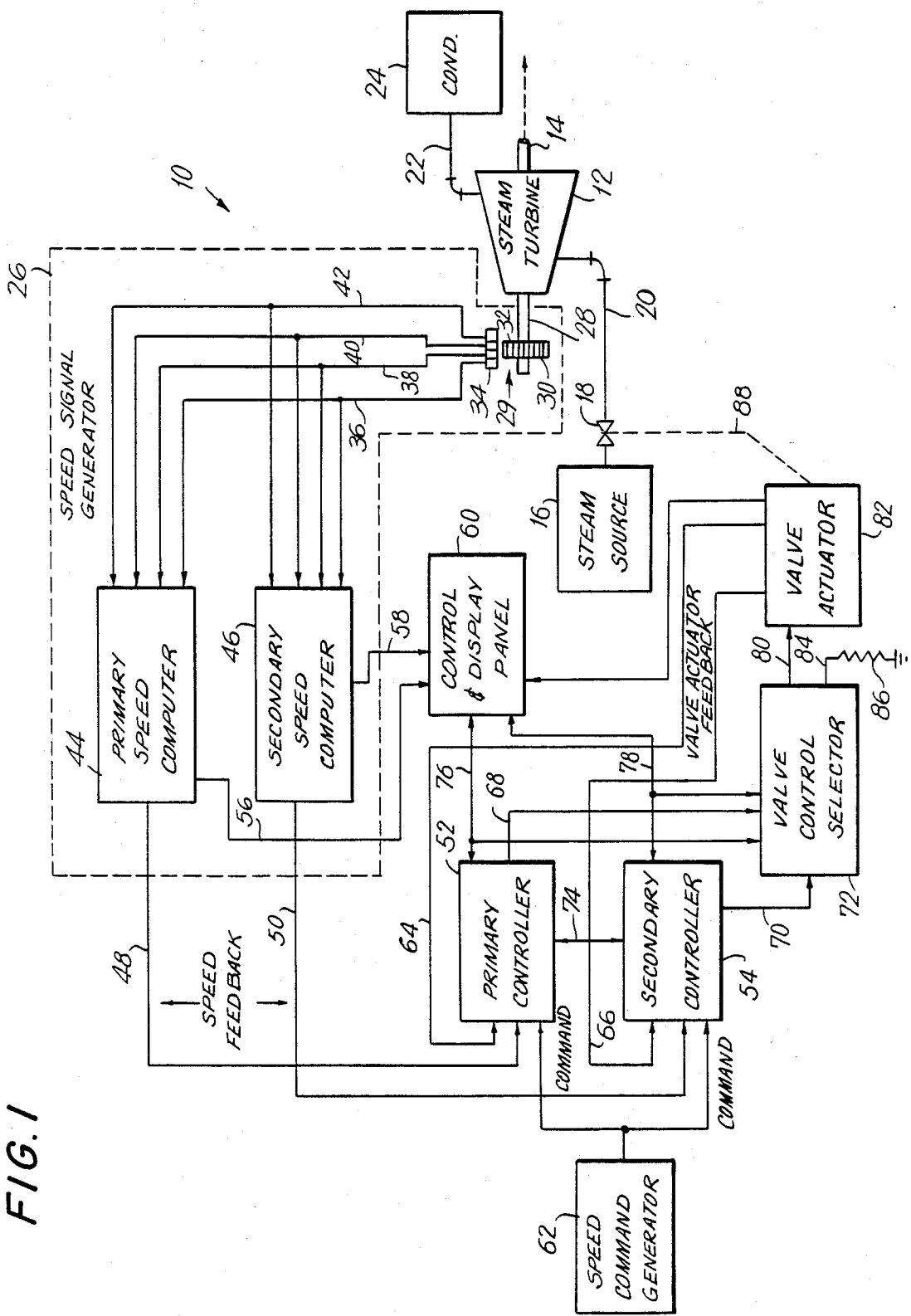
FIG. 1 is a block schematic diagram of a steam turbine control system according to an embodiment of the present invention.

Referring now to FIG. 1, there is shown, generally at 10, a control system for controlling the speed of a variable speed steam turbine 12. Steam turbine 12 may be a conventional, industrial or marine turbine suitable for applying torque to a drive shaft 14 at a controllable speed and/or pressure. Steam turbine 12 is driven by steam generated in a conventional steam source 16 fed through a valve 18 and a steam pipe 20. Valve 18 is conventionally built into steam turbine 12 but is shown separated in FIG. 1 for clarity. Exhaust steam from steam turbine 12 is conveyed through an exhaust steam pipe 22 to a conventional condenser 24. Since steam source 16, valve 18, steam turbine 12 and condenser 24 are conventional devices and do not, in themselves, constitute an inventive portion of the present disclosure, detailed description thereof is omitted.

A speed signal generator, shown generally at 26, includes redundant components for generating redundant digital signals representing the speed of drive shaft 14. An extension or auxiliary shaft 28, rotated at a speed proportional to the speed of drive shaft 14, actuates a speed sensor 29. Speed sensor 29 may be of any type known or to become known in the art including, for example, magnetic, capacitive, inductive, optical or mechanical devices. In the preferred embodiment, speed sensor 29 includes a toothed wheel 30 having a predetermined number of equally spaced teeth 32 on its perimeter rotated by auxiliary shaft 28 in the vicinity of a plurality of speed pickups 34. Although any number of speed pickups may be used, in the embodiment shown, four speed pickups 34 are maintained in the vicinity of toothed wheel 30 and each produces an output signal in response to the passage of each of teeth 32. Speed pickups 34 are independent of each other and failure in one thereof does not itself cause failure in any of the others. Thus, the four speed pickups 34 produce four independent speed signals which are transmitted on lines 36, 38, 40 and 42 to a primary speed computer 44 and a secondary speed computer 46.

Primary and secondary speed computers 44 and 46 each independently test the four speed signals, eliminate speed signals from speed pickups 34 which are faulty, calculate a digital speed feedback signal and apply these digital speed feedback signals on lines 48 and 50 to primary and secondary controllers 52 and 54, respectively. In addition, primary and secondary speed computers 44 and 46 produce sensor status data which is applied on lines 56 and 58 to a control and display panel 60. The sensor status signal may produce an operator indication on control and display panel 60 informing an operator about failures in speed pickups 34 and, optionally, identifying the specific element or elements which have failed.

A speed command generator 62 produces a speed command signal which is applied in parallel to command inputs of primary and secondary controllers 52 and 54. Speed command generator 62 preferably produces a digital signal containing information about the speed desired in drive shaft 14. Speed command generator 62 may be of any convenient type such as, for example, a manual control, programmed digital control, or a signal derived from the process being driven by steam turbine 12.

Primary controller 52 and secondary controller 54 also receive separate valve actuator feedback signals on lines 64 and 66, respectively, produced in a manner to be described hereinafter. Primary controller 52 and secondary controller 54 each produce a control output signal in response to its respective input. These output signals are applied on lines 68 and 70, respectively, to a valve control selector 72. Primary controller 52 and secondary controller 54 are interconnected by a status bus 74 which permits each controller to keep its counterpart informed about its internal health.

Under normal circumstances in the absence of a failure in primary controller 52 and the circuits feeding it, primary controller 52 is selected as the control source by valve control selector 72. If a failure occurs in primary controller 52 or the circuits feeding it, this information is transmitted to secondary controller 54 on status bus 74 and a process of transfer of control from primary controller 52 to secondary controller 54 is initiated. This status information may also be communicated both to control and display panel 60 and to valve control selector 72 on lines 76 and 78. Valve control selector 72 applies the one of its inputs which a control logic indicates is a correct input on a line 80 to a valve actuator 82. The other input to valve control selector 72 is applied on a line 84 to a termination 86.

Termination 86, shown as a resistive element, is selected to provide the same characteristics to valve control selector 72 as does valve actuator 82. That is, if valve actuator 82 represents a substantially pure resistive load, termination 86 may be a pure resistor as shown. Alternatively, if valve actuator 82 includes a substantial reactive component, termination 86 may be selected to have a corresponding reactive component.

Valve actuator 82 provides a mechanical output represented by a dashed line 88 which is effective to proportionately open and close valve 18 in response to the signal on line 80. In addition, valve actuator 82 includes components (not shown in FIG. 1) which are effective to produce two independently generated valve actuator feedback signals on lines 64 and 66 each of which represents the amount by which valve 18 is open. A line 94 may optionally be provided to transmit valve condition information to control and display panel 60.

In an ideal system, steam turbine 12 could be controlled to a predetermined speed by simply opening valve 18 a predetermined amount. In such case, speed signal generator 26 would not be required. In a practical system, however, input, internal and external variables such as, for example, the pressure, temperature, water content and molecular weight of the steam, changing load characteristics, bearing and valve wear, changing turbine tip clearances, and the build up of scale and corrosion tend to make the relationship between valve position and speed variable both in the short and the long term. Thus, for adequate control of the speed of steam turbine 12, an inner feedback loop consisting of valve actuator feedback signals from valve actuator 82 to primary and secondary controllers 52 and 54 must be supplemented by an outer loop consisting of speed feedback signals produced by speed signal generator 26.

Primary and secondary speed computers 44 and 46 may use any convenient technique for detecting faulty speed pickups 34 such as, for example, two-out-of-three or two-out-of-four voting. In the preferred embodiment, the speed signal on each of lines 36, 38, 40 and 42 is monitored for individual pickup failure. Although momentary failure of a speed pickup 34 can be tolerated, a large number of successive failures cannot. Thus, in the preferred embodiment, upon failure of a speed pickup whose output is being employed by either primary speed computer 44 or secondary speed computer 46, a count is initiated against such failed pickup to determine the number of successive outputs which are faulty. Upon counting a predetermined number N of faulty pickup outputs, primary and secondary speed computers 44 and 46 independently switch the failed pickup into inactive status.

Primary and secondary speed computers 44 and 46 continue to monitor the output of a pickup which has been determined to be defective in order to sense the spontaneous clearing of an intermittent failure. If this continued monitoring detects the successive occurrence of M good outputs, then the affected pickup is considered to be good and becomes a candidate for again supplying speed signals.

Figure 2A:
FIGS. 2A–2E are curves to which reference will be made in describing a speed signal generator of FIG. 1.
Figure 2B:
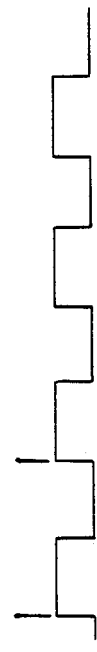
Figure 2C:

In the preferred embodiment, speed sensing is performed by counting the number of high-frequency pulses generated by a crystal-controlled clock oscillator during a predetermined condition of the output of the related speed sensor. Referring to FIG. 2A, a clock oscillator output is shown in which a large number of narrow clock pulses are produced. FIG. 2B shows the squared output of one of speed pickups 34. If the predetermined condition of the pickup signal is defined to be the positive-going leading edges of two succeeding cycles as indicated by the vertical line above the waveform of FIG. 2B, the pulses of FIG. 2A are counted for one cycle of the speed signal as indicated in FIG. 2C. The turbine speed is, of course, inversely proportional to the number of pulses counted during a cycle. That is, as the turbine speeds up, the period of one cycle is reduced in proportion and thus the number of clock pulses occurring in the cycle is correspondingly reduced.

Figure 2D:
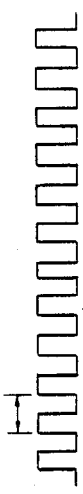
Figure 2E:
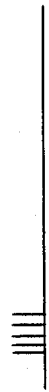

The above system is satisfactory for speed measurement systems where relatively low dynamic range is required. However, in a variable speed steam turbine for industrial use, the speed control system may be required to control turbine speeds from as low as 1 rpm to as high as 20,000 rpm. A clock frequency high enough to produce appreciable counts during a sensor cycle at the highest rpm would be clearly out of the question for measuring speed at the lowest rpm. For example, FIG. 2D shows a speed sensor output at a frequency four times as great as that shown in FIG. 2B. With the same clock frequency and using succeeding positive-going leading edges as the gating point, only one-quarter as many clock pulses are counted as indicated in FIG. 2E. It would be clear to one skilled in the art that the resolution with which speed can be determined is substantially decreased as the number of pulses counted is reduced with increasing speed.

The applicant has discovered that two ways can be used to retain substantial resolution over a very large dynamic range. In one of these ways, the clock frequency is changed as a function of measured speed. That is, at slow speed, a low clock frequency can be used whereas at higher speeds one or more higher clock frequencies can be employed. The clock frequency selected can be determined based on a preceding speed measurement. The second way to improve speed resolution is to change the number of speed cycles over which clock pulses are counted. For example, FIG. 2D, if instead of counting clock pulses only during a single cycle of the speed signal, the clock pulses are counted for, for example, four cycles of the speed signal, approximately the same number of pulses would be counted as in the case of the much slower speed signal of FIG. 2B.

Figure 3:
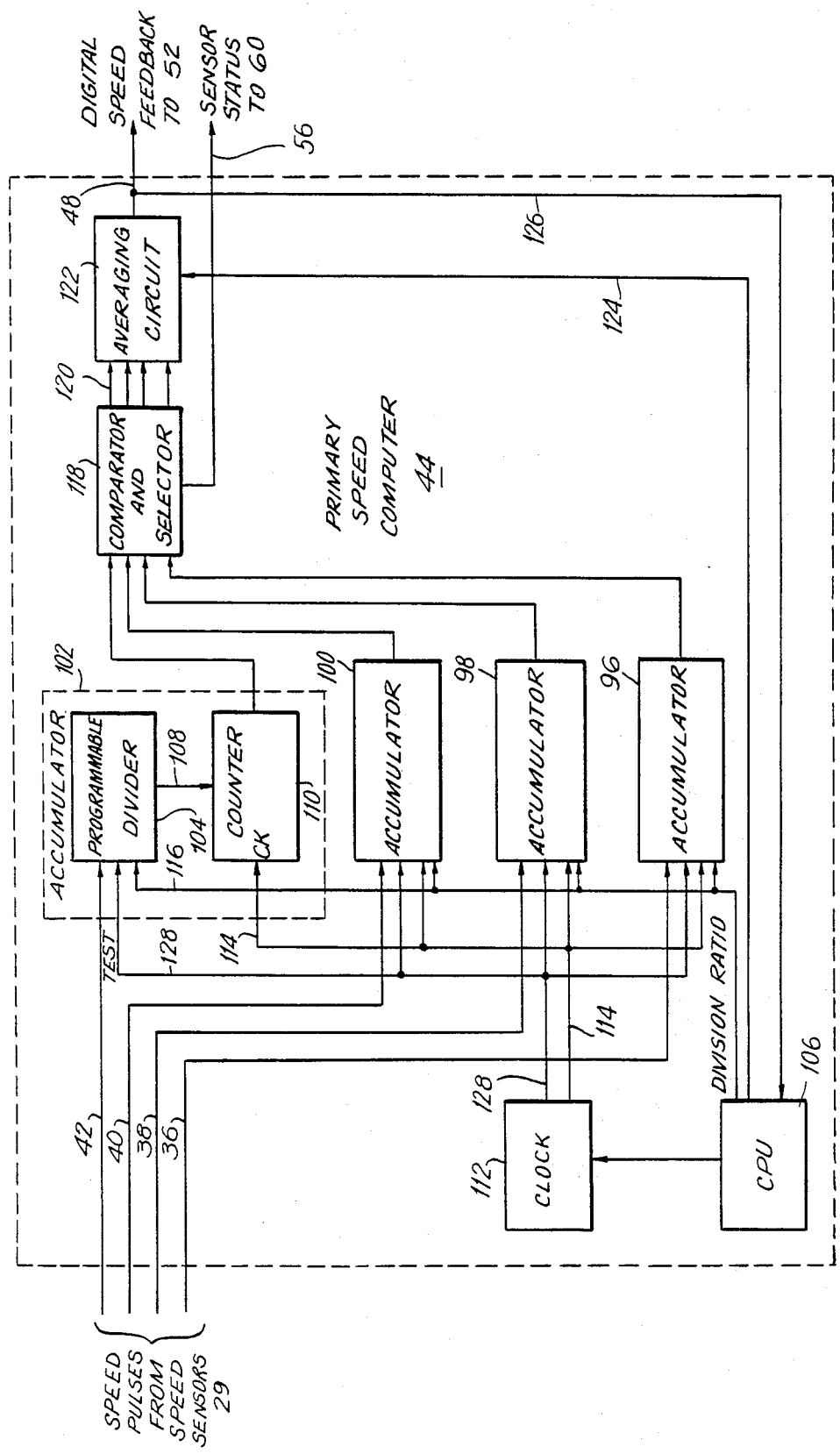
FIG. 3 is a block diagram of a speed computer of FIG. 1.

Referring now to FIG. 3, there is shown one embodiment of a speed computer which, in the figure, is assumed to be the primary speed computer 44. Secondary speed computer 46 (FIG. 1) is identical to primary speed computer 44 and is thus not described in detail.

The speed pulses on line 36 are applied to an accumulator 96 in primary speed computer 44. Similarly, speed pulses on lines 38, 40 and 42 are applied to accumulators 98, 100 and 102, respectively. Accumulators 96–102 are identical, therefore, only accumulator 102 is shown in detail and described hereinafter.

The speed pulses on line 42 are applied to a programmable divider 104 which is controlled by an output of a CPU 106 to provide a gating output on a line 108 to a counter 110. A clock 112 provides clock pulses on a line 114 to a clock input CK of counter 110. A signal fed from CPU 106 to programmable divider 104 on a line 116 controls the division ratio of programmable divider 104 and thus controls the number of cycles of the speed signal on line 42 during which programmable divider 104 enables counter 110 to count clock pulses. The division ratio on line 116 increases with increasing speed as will be explained.

Each of accumulators 96, 98, 100 and 102 ends each counting cycle with a count contained in its respective counter. Each of these counts should be substantially identical if the associated speed pickup and circuits within the accumulators are functioning properly. The accumulated counts are applied to a comparator and selector 118 to determine whether one or more of the counts deviates substantially from the others. Any counts which are determined to be substantially different are eliminated in comparator and selector 118 and all of the remaining counts are transmitted on lines 120 to an averaging circuit 122.

Although any relationship between speed pulses and rpm's can be established, for convenience of description, it is assumed that toothed wheel 30 contains exactly 60 teeth so that one revolution of shaft 14 produces 60 cycles of a speed signal. Thus, the number of cycles per second produced by line 36 is equal to the shaft speed in rpm. With this simplification, $$\text{speed (RPM)} = \frac{f_c N}{\text{count}}$$

where:
$f_c$ = clock frequency Hz
$N$ = number of speed cycles
count = clock pulses counted during $N$.

Averaging circuit 122 performs the calculation which divides the numerator in the preceding equation by the count to determine the speed in rpm. In order to accomplish this, averaging circuit 122 receives signals from CPU 106 which inform it of the clock frequency $f_c$ and the number of speed cycles N being employed on line 124. Averaging circuit 122 takes the average of the thus calculated speeds from all of the properly functioning speed pickups and provides this average speed signal on line 48 to primary controller 52. In order to keep CPU 106 updated as to the measured speed so that it can control clock 112 and the programmable dividers in accumulators 96, 98, 100 and 102, the digital speed feedback signal is applied on a line 126 to CPU 106.

A test signal is applied on a line 128 to programmable divider 104 in accumulator 102 as well as to corresponding elements in accumulators 96, 98 and 100. The test signal is substituted for the speed pulses on lines 36–42 to determine whether an apparent fault in a speed pickup is, in fact, due to the speed pickup or is due to downstream components. The test signal is selected to have a nominal frequency somewhere in the expected range of frequencies of speed pulses. In the preferred embodiment, the test signal on line 128 is about 2 KHz. While the test signal is being employed, counter 110, and corresponding elements in the other accumulators, are directly controlled by clock 112. Comparator and selector 118 will receive the test signal as it is applied to each accumulator to determine the location of the fault.

Figure 4:
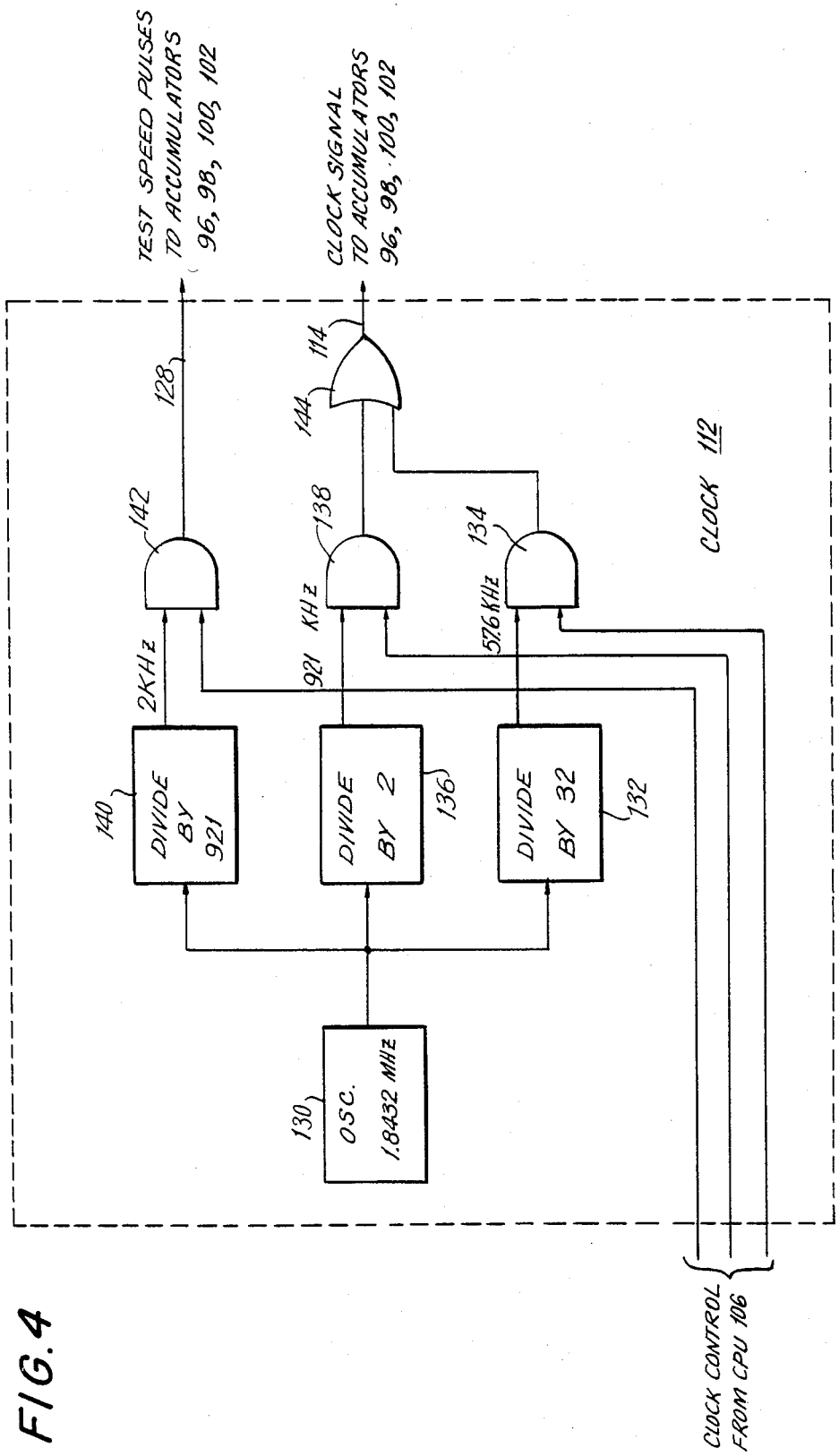
FIG. 4 is a logic diagram of a programmable clock of FIG. 1.

Referring now to FIG. 4, clock 112 is seen to include a clock oscillator 130 which is preferably a crystal-controlled oscillator operating at a high frequency of, for example, 1.8432 MHz. A first divider 132 divides the clock frequency by a relatively large factor such as, for example, by 32 to produce a clock frequency of 57.6 KHz which is applied to one input of an AND gate 134. The second input of AND gate 134 receives a control signal from CPU 106. A second divider 136 divides the oscillator frequency by a smaller factor than does divider 132 such as, for example, a factor of 2 to produce a frequency of 921.6 KHz which is applied to an AND gate 138. A further divider 140 divides the oscillator frequency by a very high factor of, for example, 921 to produce a test frequency of, for example, 2 KHz which is applied to an input of an AND gate 142. The second inputs of AND gates 138 and 142 receive control signals from CPU 106. Outputs of AND gates 134 and 138 are applied to an OR gate 144. The clock signal at the output of OR gate 144 is applied via line 114 to the clock input CK of accumulator 102 (FIG. 3). The 2 KHz signal from AND gate 134 is applied on line 128 to inputs of each of accumulators 96, 98, 100 and 102 (FIG. 3).

Referring now to FIGS. 1, 3 and 4, when steam turbine 12 is started either from a stop or from a low speed of 5 to 20 rpm at which it may be spun by an external electric motor (not shown), CPU 106 provides an enable signal to an input of AND gate 134 and inhibit signals to the inputs of AND gates 138 and 142 so that the clock signal transmitted on line 114 is 57.6 KHz. At such very low speed, the interval control signal on line 108 enables counter 110 to count clock pulses for a period equal to one cycle of the speed pulses on line 42. Corresponding circuits in accumulators 96, 98 and 100 count speed pulses for the same period.

As steam turbine 12 speeds up under the command of the appropriate controller 52 or 54, CPU 106 determines the measured speed at the end of each measurement cycle and enables the appropriate one of AND gates 134 and 138 in response thereto. Although any dividing line can be selected based principally upon the mechanical characteristics of the apparatus being controlled, in the preferred embodiment the value of N is increased by one each time the speed increases by 64 rpm. That is, at speeds of from 1 to 64 rpm, N=1; at speeds from 65 to 128 rpm, N=2, etc.

While the shaft speed is increasing, when the shaft speed exceeds 200 rpm, the input of AND gate 134 is inhibited and the input of AND gate 138 is enabled so that the clock frequency changes from 57.6 KHz to 921 KHz. This occurs under the rules stated hereinabove while N=4. This increases the measurement resolution by a factor of 16 at this point during increasing shaft speed. At 257 rpm, N is increased by one and continues to increase by one additional integer for each increase in shaft speed of 64 rpm. This fixes the minimum pulses counted during N at about 11,500 and the maximum at less than 14,400. During decreasing rpm, the higher clock frequency is retained down at 100 rpm and thereafter the lower clock frequency is employed. This hysteresis in clock frequency improves the stability of operation by preventing jittering between the two clock frequencies with resultant possibility of sudden changes in control signal.

The 2 KHz signal produced by divider 140 is gated onto line 128 by enablement of AND gate 142 so that accumulators 96, 98, 100 and 102 can be driven with a known signal to isolate problems to pickup or counter.

It should not be assumed from the preceding that all of the hardware elements shown in primary speed computer 44 are duplicated in secondary speed computer 46. In fact, in the preferred embodiment, CPU 106 may be shared between the two computers and also may perform computing functions for other elements in the system such as controllers 52 and 54 and control and display panel 60.

Primary and secondary controllers 52 and 54 are identical except for the sources of some of their signals. Thus, only primary controller 52 is described in detail.

Figure 5:
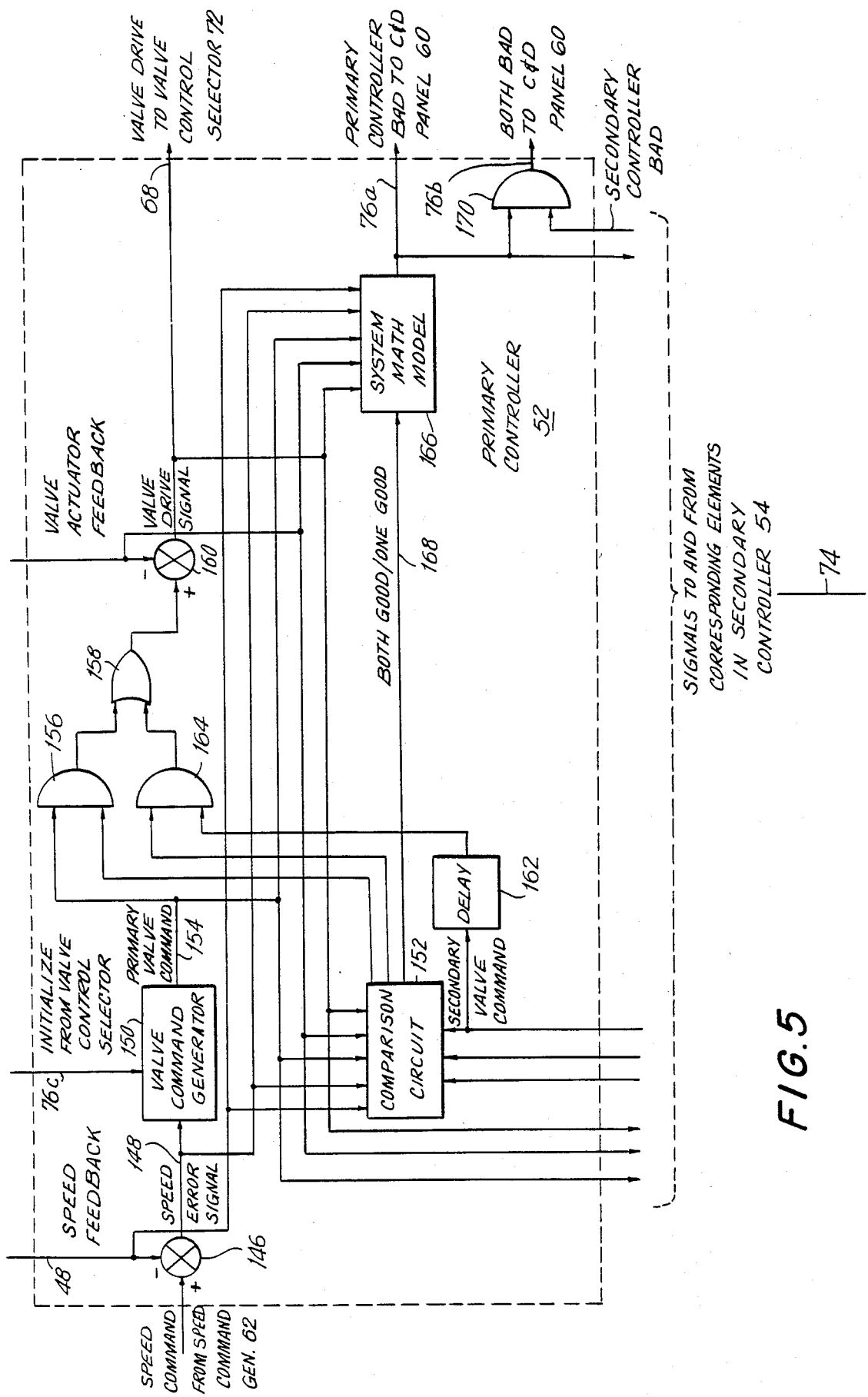
FIG. 5 is a block diagram of a controller of FIG. 1.

Referring now to FIG. 5, the speed command signal from speed command generator 62 is applied to one input of an adder 146 which receives the speed feedback signal on line 48 at its other input. The difference between the speed command and speed feedback signals is a speed error signal which is communicated on a line 148 to a valve command generator 150 and to a comparison circuit 152. Valve command generator 150 produces a valve command signal on a line 154 in response to the speed error signal at its input which is applied to one input of an AND gate 156, an input of comparison circuit 152 and on status bus 74 to secondary controller 54. A second input of AND gate 156 receives an enable signal from comparison circuit 152 when primary controller 52 is determined to be good. The output of AND gate 156 is applied through an OR gate 158 to an input of an adder 160.

The valve actuator feedback signal on line 64 is applied to a second input of adder 160, an input of comparison circuit 152 and is communicated to secondary controller 54 on status bus 74. The difference between the valve command signal from OR gate 158 and the valve actuator feedback on line 64 is the valve drive signal which is applied on line 68 to valve control selector 72, to an input of comparison circuit 152 and is communicated on status bus 74 to secondary controller 54.

A valve command signal from secondary controller 54, besides being applied to comparison circuit 152 is also applied to a delay 162. Delay 162 delays the secondary valve command for a predetermined period such as, for example, two counting intervals of primary speed computer 44 (FIG. 1). The delayed secondary valve command is applied to one input of an AND gate 164. The second input of AND gate 164 is enabled by an output of comparison circuit 152 when it is determined that primary controller 52 is bad. The use of delay 162 ensures that the valve drive signal which is applied on line 68 to valve control selector 72 does not deviate substantially from the desired value due to failure of primary controller 52. That is, as soon as comparison circuit 152 determines that there is a fault and switchover from the primary valve command signal from AND gate 156 to the delayed secondary valve command signal from AND gate 164, the signal from AND gate 164 is responsive to speed inputs which existed two sampling periods before the fault was detected. This ensures that the valve drive signal 68 does not go out of control before secondary controller 54 can assume control and begin initializing its constants.

A system mathematical model 166 receives the same inputs as comparison circuit 152 from lines 68, 64, 154, 148 and 48. In response to such inputs, system mathematical model 166 produces model results which determine whether valve command generator 150 and its associated circuits are producing valve drive signals which are appropriate to the inputs. Comparison circuit 152 receives corresponding signals from secondary controller 54. When corresponding inputs of the two circuits indicate correct operation of both circuits, a both good signal is applied on a line 168 to system mathematical model 166. Under this circumstance, system mathematical model 166 continues to apply a low output on line 76a to control and display panel 60 as well as to an AND gate 170. The low or zero applied to the input of AND gate 170 inhibits this AND gate. The low on line 76a informs control and display panel 60 that the primary controller is still in operating condition. The signal from system mathematical model 166 is applied on a line in status bus 74 to a corresponding input of secondary controller 54.

If primary controller 52 is providing output signals which are inconsistent with its input signal, this fact will be detected both by system mathematical model 166 and by the comparison circuit (not shown) in secondary controller 54. In this case, system mathematical model 166 will produce a high or one output which will enable one input of AND gate 170. In addition, system mathematical model 166 provides an alarm signal on line 76a to control and display panel 60 indicating that primary controller 52 is bad. At the same time, if secondary controller 54 is still functional, corresponding circuits therein will take over the process of controlling the turbine 12 and will provide valve drive signals to valve control selector 72.

If secondary controller 54 begins to provide control signals which are inconsistent with its inputs, this fact will be detected by a counterpart of the system mathematical model in secondary controller 54 and a high or one signal will be applied to AND gate 170 in primary controller 52. If primary controller 52 is also determined to be faulty, the one at the second input of AND gate 170 enables both inputs of AND gate 170 and produces a both bad signal on line 76b for connection to control and display panel 60 where this fact may be indicated with possible diagnostic display to the operator.

The functions shown and described in primary controller 52 may be performed by circuits made up of discrete components or small, medium or large scale integrated circuits, and may be performed by either analog or digital apparatus. In the preferred embodiment, the input signals are digital, internal processing is digitally performed and some or all of the calculations and signal generation is performed employing digital computers. In the most preferred embodiment, some or most of such functions are performed by a microprocessor. Each of primary and secondary controllers 52 and 54 may contain their own independent microprocessors or they may be combined with each other and optionally be combined with primary and secondary speed computers 44 and 46.

Figure 6:
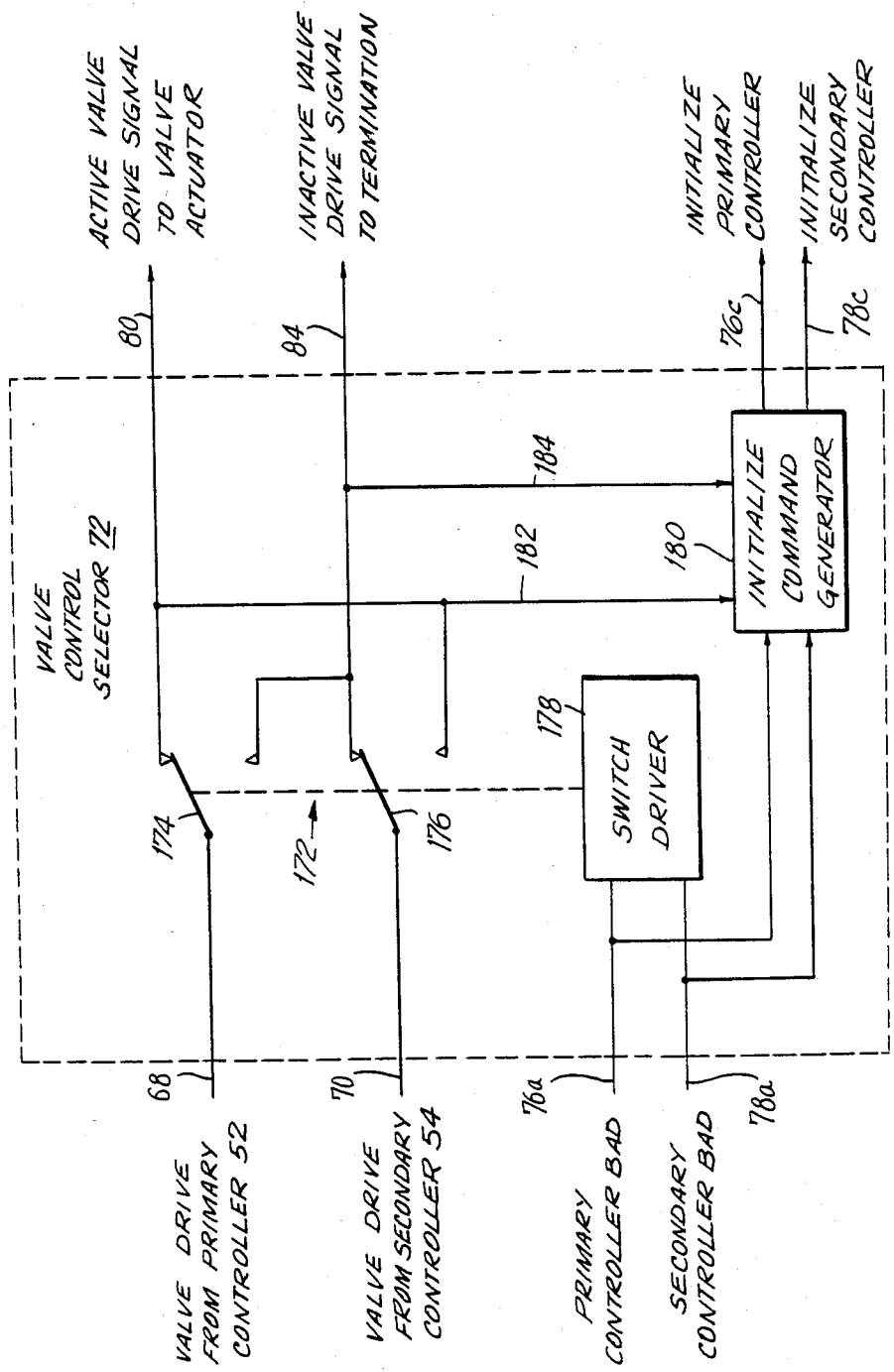
FIG. 6 is a block and schematic diagram of a valve control selector of FIG. 1.

Referring now to FIG. 6, valve control selector 72 is seen to consist of a double-pole double-throw switch 172 which receives valve drive signals on lines 68 and 70 from primary and secondary controllers 52 and 54 at movable elements 174 and 176, respectively. Switch 172 is driven by a switch driver 178 in response to signals on lines 76a and 78a indicating that the primary or secondary controller, respectively, is bad. Thus, in the condition shown, if valve actuator 82 is being fed the valve drive signal from line 68 produced by primary controller 52 and a fault is detected in primary controller 52, an appropriate signal on line 76a indicating that the primary controller is bad causes switch driver 178 to reverse the positions of movable elements 174 and 176. The primary and secondary controller bad signals on lines 76a and 78a are also applied to an initialize command generator 180 which also receives the active and inactive valve drive signals on lines 182 and 184, respectively.

Referring momentarily to FIG. 1, even though all of the elements of speed pickup 34 may be producing identical speed signals, long-term drift in downstream components may produce slightly different valve drive signals on lines 68 and 70. Referring again to FIG. 6, in order to correct the active valve drive signal so that it rapidly assumes a value closely equalling the value of the valve drive signal from primary controller 52 before it went bad, initialize command generator 180 transmits signals to secondary controller 54 on a line 78c immediately after secondary controller 54 assumes control which forces the valve command generator in secondary controller 54 to reinitialize its internal constants to correct for any drift which may have occurred. Although this permits a slight change equal to the long-term drift to exist in the digital valve command signal fed to adder 160, this change endures for only a single speed sampling cycle of a few milliseconds. This period is too short to significantly affect the analog circuits downstream of adder 160 and the relatively slowly responding steam turbine 12.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a control system effective to produce a control signal for controlling a turbine having a shaft rotating at a speed controllable by a position of a valve, said valve being responsive to said control signal, said control system including primary and secondary controllers; the control system including means for producing a speed command signal, a speed feedback signal and a valve position feedback signal, each of said controllers, comprising:

means for producing a speed error signal proportional to a difference between said speed command and speed feedback signals;

a valve command generator responsive to said speed error to produce a valve command signal;

means for producing a valve drive signal in response to a difference between said valve command and valve position feedback signals;

a comparison circuit receiving at least some of said speed feedback, speed error, valve command, valve position feedback and valve drive signals;

means for communicating said, valve command, valve position feedback and valve drive signals in each one of said primary and secondary controllers to the comparison circuit in the other one thereof, the comparison circuit in each of said primary and secondary controllers being effective to detect differences between inputs from its own and from the other controller and, upon determining that said differences may indicate that its controller is bad, producing a one bad signal indicative of this fact; and, a system mathematical model responsive to at least some of inputs and outputs of said controller effective to predict correct responses of said controller to said inputs, said system mathematical model being effective to produce a controller bad signal when its controller produces outputs inconsistent with its inputs.

2. A control system according to claim 1, further comprising gating means in each one of said primary and secondary controllers controlling application of said control signal to said valve, said gating means being effective, upon detection than its controller is bad, to inhibit said control signal from its own controller and to substitute said control signal from the other controller.

3. A control system according to claim 2, further comprising means for applying a predetermined delay in said control signal from said other controller whereby transients are reduced during the substitution.

* * * * *